United States Patent [19]
Collins et al.

[11] 3,923,492
[45] Dec. 2, 1975

[54] REGULATING PLANT GROWTH WITH 7-METHYLINDOLE

[75] Inventors: David John Collins, Ascot; Edwin Francis George, Eversley, both of England

[73] Assignee: Imperial Chemical Industries Limited, London, England

[22] Filed: June 17, 1974

[21] Appl. No.: 480,271

[30] Foreign Application Priority Data
June 29, 1973 United Kingdom............... 31024/73

[52] U.S. Cl.......................................... 71/76; 71/96
[51] Int. Cl.² ........................................... A01N 9/22

[58] Field of Search.................................. 71/76, 96

[56] References Cited
OTHER PUBLICATIONS
Collet et al., Chem. Abst., Vol. 63, (1965), 17053b.
Pilet et al., Chem. Abst., Vol. 54, 13287b.

*Primary Examiner*—Lewis Gotts
*Assistant Examiner*—Catherine L. Mills
*Attorney, Agent, or Firm*—Cushman, Darby & Cushman

[57] ABSTRACT

A method of regulating the growth of plants which comprises applying to the plants 7-methylindole.

5 Claims, No Drawings

REGULATING PLANT GROWTH WITH 7-METHYLINDOLE

This invention relates to a method of regulating the growth of plants and to plant growth regulating compositions.

U.S. Pat. No. 3,671,214 discloses that indoles substituted in the 1- and 2- positions (as well as, optionally, in other positions) have herbicidal activity. We have now discovered an indole which is significantly more active in regulating the growth of plants.

According to the present invention, we provide a method of regulating the growth of plants, which comprises applying to plants 7-methylindole.

The process of our invention is applicable to retard or stunt the growth of plants, and may be used in some cases (depending on the type of plant treated, and the dose rate used) to kill plants. The process is particularly efficient in treating monocotyledonous plants (grasses). Thus, in suitable circumstances, the invention may be used selectively to control the growth of grasses, e.g. in broad-leaved crops. Either roots or foliage of plants may be treated: the former, for example, by root drench or seed dressing, the latter, for example by aqueous foliar spray.

The indole used in our invention is a known chemical compound; the skilled chemist can synthesise it by a variety of method. For example, the synthesis of 7-methylindole is described by E. Hoffman et al. Journal of Heterocyclic Chemistry (1965) 2 p 298 and by L. Marion et al in Canadian Journal of Research 25B, PP 1–13 (1947).

The indoles may be used, if desired, in the form of other chemical compounds which readily react to give them under the conditions of use.

In carrying out the process of the invention the indoles are preferably applied in the form of a composition, in which the active ingredient is mixed with a diluent or carrier.

In another aspect, therefore the invention provides plant growth regulating compositions comprising as an active ingredient 7-methylindole.

Solid compositions may be in the form of seed dressings, dusting powders or granules, wherein the active ingredient is mixed with a finely divided solid diluent. Suitable solid diluents include Kaolin, bentonite, kieselguhr, dolomite, calcium carbonate, talc, powdered magnesia, Fuller's earth and gypsum. Solid compositions may also be in the form of dispersible powders or grains, comprising, in addition to the active ingredient, a surfactant to facilitate the dispersion of the powder or grains in liquid.

Liquid compositions include solutions, dispersions or emulsions containing the active ingredient together with one or more surfaceactive agents such as wetting agents, dispersing agents, emulsifying agents, or suspending agents.

Surface-active agents may be of the cationic, anionic, or non-ionic type. Suitable agents of the cationic type include, for example, quaternary ammonium compounds, for example cetyltrimethylammonium bromide. Suitable agents of the anionic type include, for example, soaps; salts of aliphatic mono-esters of sulphuric acid, for example sodium lauryl sulphate; and salts of sulphonated aromatic compounds, for example sodium dodecylbenzenesulphonate, sodium, calcium, and ammonium lignosulphonate, butylnaphthalene sulphonate, and a mixture of the sodium salts of diisopropyl- and triisopropyl- naphthalene- sulphonic acid. Suitable agents of the non-ionic type include, for example, the condensation products of ethylene oxide with fatty alcohols such as oleyl alcohol and cetyl alcohol, or with alkyl phenols such as octylphenol, nonylphenol, and octylcresol. Other non-ionic agents are the partial esters derived from long chain fatty acids and hexitol anhydrides, for example sorbitan monolaurate; the condensation product of the said partial esters with ethylene oxide; and the lecithins. Suitable suspending agents are, for example, hydrophilic colloids, for example polyvinylpyrrolidone and sodium carboxymethylcellulose, and the vegetable gums, for example gum acacia and gum tragacanth.

The aqueous solutions, dispersions or emulsions may be prepared by dissolving the active ingredient in water or an organic solvent which may, if desired, contain one or more wetting, dispersing, or emulsifying agents and then, in the case when organic solvents are used, adding the mixture so obtained to water which may, if desired, likewise contain one or more wetting, dispersing or emulsifying agents. Suitable organic solvents are ethylene dichloride, isopropyl alcohol, propylene glycol, diacetone alcohol, toluene, kerosene, methylnapthalene, xylenes and trichloroethylene.

The indole may also be formulated by microencapsulation. Microcapsules containing the desired indole may be prepared by co-acervation; or, more preferably, by stirred interfacial polymerisation of (for example) an isocyanate/ diamine system. The resulting microcapsules may be used as an aqueous suspension.

The compositions which are to be used in the form of aqueous solutions, dispersions or emulsions are generally supplied in the form of a concentrate containing a high proportion of the active ingredient, and the concentrate is then diluted with water before use. These concentrates are usually required to withstand storage for prolonged periods and after such storage, to be capable of dilution with water in order to form aqueous preparations which remain homogeneous for a sufficient time to enable them to be applied by conventional spray equipment. In general, concentrates may conveniently contain from 10–60 percent by weight of the active ingredient or ingredients. Dilute preparations ready for use may contain varying amounts of the active ingredient or ingredients, depending upon the purpose for which they are to be used, and a dilute preparation containing between 0.01 and 10.0 percent and preferably 0.01 and 1 percent, by weight of active ingredient or ingredients may normally be used.

Particularly useful compositions according to the invention include mixtures of the indole of the invention with other plant growth regulating agents, including, for example, maleic hydrazide, chlorflurecol, the compound $(CH_3)_2N.NH.CO.CH_2.CH_2COOH$ ('Alar'), and carbetamide. Such plant growth regulating agents may also be herbicides, e.g. simazine or atrazine. Preferred are herbicides effective against broad leaved weeds, particularly such herbicides which are selectively active against broad-leaved weeds, for example hormone herbicides such as 2,4-D,MCPA, mecoprop and dichlorprop. The compounds of the invention may be formulated as mixtures with solid or liquid fertilisers, or with ferrous sulphate.

The plant growth regulating effects of the compounds used in the process of the invention are manifested chiefly as a stunting or dwarfing effect in the plants to which they are applied. Such stunting or dwarfing is useful, for example in stunting the growth of sugar cane thereby increasing the concentration of sugar in the cane at harvest. Grass may be treated to slow down growth, so that it need not be mown so often. Flowering of grasses, in some circumstances, may be inhibited.

In carrying out the process of the invention, the amount of compound to be applied to regulate the growth of plants will depend upon a number of factors, for example the particular formulation selected for use, whether the compound is to be applied for foliage or root uptake, the effect desired, and the identity of the plant species whose growth is to be regulated. However in general an application rate of from 1 to 20 kg per hectare is suitable, while from 2 to 5 kg per hectare is preferred for most purposes. Where herbicidal effects are desired, rates used are naturally in general higher than where growth stunting is the object. In all cases routine tests are necessary to determine the best rate of application of a specific formulation for any specific purpose for which it is suitable.

The invention will now be illustrated by the following Examples, in which, unless otherwise stated, parts are by weight and degrees are centigrade.

EXAMPLE 1

This Example illustrates a composition according to the invention in the form of an emulsifiable concentrate formulation of 7-methylindole, suitable for dilution with water.

| | % Weight/Volume |
|---|---|
| 7-Methylindole | 20 |
| Condensate of 2 moles ethylene oxide with a mixture of oleyl and cetyl alcohols | 5 |
| Mixture of calcium dodecyl benzene sulphonate with ethoxylated castor oil | 5 |
| Technical grade methylcyclohexanone to | 100% |

EXAMPLE 2

This Example illustrates a solid composition according to the invention comprising 7-methylindole suitable for application in the form of granules

| | Weight % |
|---|---|
| 7-methylindole | 3 |
| Pumice granules | 97 |
| | 100% |

Examples 3–6 illustrate the process of the invention in regulating the growth of plants.

EXAMPLE 3

A grass sward in an old pasture (composed mainly of *Lolium perenne*, but with *Poa annua*, *Agrostis* spp and *Holcus lanatus* also present) was cut to a constant level in the spring and then dressed with nitrogenous fertilizer to encourage vigorous new growth. Plots measuring 3 m × 2 m were pegged out on the grass and 10 days afterwards the following chemical treatments were each sprayed onto 3 such areas:
1. 7-methylindole at a rate equivalent to 3 kg/ha.
2. 7-methylindole at 1 kg/ha 3. 3:1 mixture of maleic hydrazide and chlorflurecol at 4 kg/ha.

3 replicate plots were retained untreated as controls.

The dispersions of 7-methylindole used for treatments 1 and 2 were prepared by diluting an appropriate quantity of the emulsifiable concentrate of Example 1 with a 0.1 percent aqueous solution of a wetting agent, consisting of a condensate of 1 mole of nonyl phenol with 8 moles of ethylene oxide. They were applied to the respective plots at a volume equivalent to 400 l/ha.

28 days after spraying it was noticed that the grass in the treated plots had grown considerably less than that in the control areas. A measure of the relative growth is shown in Table 2 below by the average fresh weight of grass cut from the plots at this time.

Treatment 3 is a standard mixture which has been used commercially to control grass growth

TABLE 2

| Treatment No. | Average Weight grass per plot Kg | % Reduction in fresh weight |
|---|---|---|
| 1 | 0.6 | 94 |
| 2 | 3.7 | 65 |
| 3 | 1.3 | 87 |
| Control | 10.6 | — |

EXAMPLE 4

Seed of several different species of grass was sown into separate 15 cm diameter flower pots filled with a peat/sand potting compost. When the seedling grass plants, which were grown fairly densely, had grown to approximately 10 cm in height, they were cut back to a height of 4 cm, allowed to regrow to a height of 5 cm and then sprayed with 7-methylindole at a rate equivalent to either 1 or 2 kg/ha. Each type of treatment was applied to 4 pots of each species of grass. A similar number of pots of each species were retained untreated as controls. The chemical was suspended in an aqueous solution of the wetting agent used in Example 3 and was applied to to plants in a volume equivalent yo 1000 l/ha.

15 Days after spraying the grass in treated and control plots was cut back to a standard height of 4 cm and the fresh weight of foliage removed was weighted. The grass in each pot was allowed to re-grow for a further 11 days when once again the foliage was cut back and weighted. As is shown in Table 3, in comparison to the controls, sprays of 7-methylindole markedly reduced the growth of each kind of grass, with, in general, low rates of burn.

TABLE 3

| Grass species | Rate kg/ha | Percentage Reduction in Fresh Weight No of days after spraying | | Final % Burn |
|---|---|---|---|---|
| | | 15 | 26 | |
| Dactylis glomerata | 2 | 86.4 | 61.0 | 5.5 |
| | 1 | 60.3 | 28.7 | 1.8 |
| Festuca rubra | 2 | 95.4 | 90.7 | 10.5 |
| commutata | 1 | 91.4 | 77.3 | 1.5 |
| Lolium multiflorum | 2 | 92.7 | 71.1 | 5.0 |
| | 1 | 71.0 | 20.4 | 3.0 |
| Phleum pratense | 2 | 93.0 | 58.2 | 26.2 |
| | 1 | 86.6 | 37.2 | 6.5 |
| Poa trivialis | 2 | 90.8 | 35.2 | 20.0 |
| | 1 | 68.1 | 5.3 | 8.5 |

EXAMPLE 5

Plants of spring barley (variety Zephyr) grown in 10 cm diameter pots and at the 3rd leaf stage, were sprayed with suspensions of 7-methylindole in a 0.1 percent aqueous solution of the wetter used in Example 3. The compound was applied to separate groups of plants at rates equivalent to 1, 2 or 5 kg/ha (The volume of liquid used being equivalent to 1000 l/ha.)

By 14 days after spraying all the treated plants had died. Plants left untreated in other similar pots were 128 cm in height at this time, and completely healthy.

EXAMPLE 6

This Example illustrates the plant growth regulating properties of 7-methylindole when applied to the roots of plants. In the following test the compound was applied to the roots of test plants grown in sand in flower pots. When the roots of the plants were established in this medium, 25 ml of distilled water containing 300 ppm 7-methylindole was applied to saturate the sand within the pot. The percentage reduction in size of treated plants compared with untreated control plants was assessed after 10 days. Results are given in Table 4.

TABLE 4

| Type of plant | % reduction in size |
|---|---|
| Spring wheat | 40 + |
| Spring barley | 40 |
| Tomato | 20 + |
| Brussels sprouts | 60 |

+ Plants darker green in colour than the controls.

EXAMPLE 7

Example 4 was repeated, using Italian Ryegrass (*Lolium italicum*) as the sole grass species, and an application rate equivalent to 5 kg active ingredient per hectare. The percentage reduction in grass growth after 15 days in comparison with the control is given in Table 5 below.

TABLE 5

| Compound No. | % Reduction in Grass Growth |
|---|---|
| 1 | 65 |

EXAMPLE 8

This Example illustrates the ability of 7-methylindole to retard the growth of bermuda-grass under field conditions.

An established bermuda-grass (*Cynodon dactylon*) pasture in North Carolina, U.S.A. was fertilised with 1120 kg/hectare of 20-20-20 fertiliser on 16 April, just after new spring growth began. It was maintained at approximately 7.5 cm in height by fortnightly machine mowings. 2,4-D (at 0.5 kg/hectare) was applied on 24 April to control broadleafed weeds. In mid-June, a top dressing of 56 kg/hectare ammonium nitrate was applied. On 26 June 7-methylindole was applied as an aqueous foliar spray to plots 8.4 square metres in area, using 2 rates of application and 4 replicates per treatment. Spray volume per plot was 250 cc, the spray solution containing 0.1 percent by volume of an alkylphenol/polyethylene oxide condensate wetter. Plots were mown at intervals after treatment, in strips 53 × 180 cm, and the weight of the fresh cut green grass recorded. Results are shown in Table 6 below.

TABLE 6

| Treatment and Rate | Fresh Cut Weight, gms. | | |
|---|---|---|---|
| | 16 | 28 | 42 Days After Spray |
| Compound No1, 3 kg/hectare | 272 | 1497 | — |
| Compound No1, 1 kg/hectare | 635 | 953 | 1724 |
| Unsprayed Control | 1270 | 1633 | 1724 |

Twelve days after treatment, seed-heads were observed to be present in the control, but not in the treated plots.

EXAMPLE 9

This Example illustrates the field use of mixtures of 7-methylindole with known grass growth retardents.

Perennial ryegrass (*Lolium perenne*) was undersown to spring wheat in Spring 1973, in the UK, on a sandy clay loam soil. The grass was cut and fertilised on 19 July, and cut again on 2 August. On 10 August the treatments detailed in Table 7 below were applied. Each treatment was replicated three times, and applied to an area 3 × 1.2 metres. Spray volume used was 400 litres/hectare, each spray containing 0.1 percent by volume of an alkylphenol/ ethylene oxide condensate wetter. Each plot was assessed visually three times, at fortnightly intervals, and the results of these assessments combined to give a visual acceptability score. All plots were harvested on 1 October (by mowing a swath a yard wide) and results are shown in Table 7 below in terms of percentage reduction in comparison with the control (fresh weight of harvested grass).

TABLE 7

| Application Rate (kg/hectare) | | | | Reduction in yield % | Acceptability | Flowering Control |
|---|---|---|---|---|---|---|
| 7-methylindole | maleic hydrazide | chlorflurecol methyl | MCPA | | | |
| — | 3.0 | 1.0 | — | 86 | 3.0 | 10.0 |
| — | 2.0 | 1.0 | — | 79 | 3.9 | 10.0 |
| 2.0 | 2.0 | — | — | 86 | 3.7 | 10.0 |
| 1.0 | 3.0 | | | 86 | 3.3 | 10.0 |
| 1.0 | 1.0 | | | 78 | 6.8 | 8.1 |
| 2.0 | 1.0 | | | 84 | 6.0 | 9.1 |
| 1.0 | 1.0 | 1.0 | | 71 | 7.8 | 9.6 |
| 1.0 | 2.0 | 1.0 | | 82 | 4.0 | 8.3 |
| 2.0 | | 1.0 | | 65 | 8.8 | 2.0 |
| 1.0 | | 1.0 | | 37 | 9.3 | 3.0 |
| 3.0 | | 1.0 | | 57 | 7.5 | 3.2 |
| | 3.0 | | | 84 | 3.5 | 9.5 |

TABLE 7-continued

| 7-methylindole | maleic hydrazide | chlorflurecol methyl | MCPA | Reduction in yield % | Acceptability | Flowering Control |
|---|---|---|---|---|---|---|
|  | 2.0 |  |  | 81 | 4.5 | 9.5 |
|  | 1.0 |  |  | 54 | 7.1 | 6.0 |
| 1.0 |  | 3.0 |  | 61 | 6.5 | 6.7 |
| 3.0 |  |  |  | 51 | 9.7 | 0 |
| 2.0 |  |  |  | 48 | 9.0 | 0.5 |
| 1.0 |  |  |  | 0 | 10.0 | 0.3 |
| 2.0 | 1.0 | 1.0 |  | 82 | 4.8 | 9.0 |
|  |  | 3.0 |  | 59 | 5.5 | 3.5 |
|  |  | 1.0 |  | 40 | 9.2 | 2.3 |
| 1.0 | 1.0 |  | 1.0 | 54 | 6.3 | 1.5 |

Acceptability is scored on a 0 (poorest) - 10 (best) scale, a score of 5 being reckoned to be the minimum for commercial acceptability. Flowering control is scored on a similar scale, from 0 (no control) to 10 (complete control). In this experiment, maleic hydrazide was more active than 7-methylindole but gave unacceptably high burn and discoloration.

Mixtures of 7-methylindole and maleic hydrazide gave nearly as much stunting as maleic hydrazide alone, but much less burn. The results for the 1:1 mixture of maleic hydrazide and 7-methylindole indicate synergism.

EXAMPLE 10

This example demonstrates the use of 7-methylindole to increase the sugar content of young sugar cane plants.

Small sugar cane plants grown singly in 10 cm diameter pots filled with a 'soil less' potting compost were sprayed with aqueous dispersions or solutions of 7-methylindole or glyphosine (N,N-bis (phosphonomethyl) glycine), a compound which has been widely reported to increase the sugar content of sugar cane plants grown in the field. The rates of each chemical employed are shown in the table below. There were 10 replicate cane plants per treatment and 10 untreated control plants for comparison.

One week after the chemicals were sprayed, the stem and leaf sheaths of each plant were cut and analysed for total hexose sugars. As is shown below, plants sprayed with dispersions of 7-methylindole were found to contain more sugars in the tissues than untreated plants. The sugar content of plants treated with 4000 ppm sprays of 7-methylindole contained appreciably more sugars than similar plants treated with glyphosine.

| Compound | Rate (ppm) | Sugar Concentration (mg sugar/g cane) |
|---|---|---|
| Glyphosine | 4000 | 10.3 |
| 7-methylindole | 4000 | 29.3 |
| 7-methylindole | 2000 | 11.9 |
| Control, untreated | — | 8.0 |

EXAMPLE 11

This example illustrates the use of 7-methylindole to stunt the growth of sugar cane plants.

The leaves of sugar canes of the variety CB 46/47 growing in Brazil were sprayed with aqueous suspensions of 7-methylindole containing 5 grams of the chemical per litre. At the time of spraying, one of the lower leaves on each of several canes was labelled. At intervals after spraying, internode distances were measured from above the marked leaf to the crown. Counts of the number of leaves above the marked leaf, at the time of spraying and at intervals afterwards showed how many new leaves had grown out since treatment.

As will be seen from the following tables, stem growth extension and the number of new leaves produced were reduced by the 7-methylindole sprays.

Average number of leaves grown on treated and control canes at intervals after spraying.

| Treatment | Days after spraying | | |
|---|---|---|---|
|  | 7 | 21 | 34 |
| 5000 ppm 7-methylindole | 1.2 | 2.06 | 3.20 |
| Control | 1.13 | 2.80 | 4.40 |

Mean cane growth following spray treatment

| Treatment | Internode distance from marked leaf to crown (cm) |
|---|---|
| 5000 ppm 7-methylindole | 10.8 |
| Control | 15.0 |

EXAMPLE 12

Granules similar to those described in Example 2, but containing 0.67 percent 7-methylindole, 1.0 percent 'Cirrasol' ALNWF and 98.3 percent pumice granules by weight, were sprinkled onto certain areas of a previously cut lawn. The rate of application was 75g granules per square metre. Grasses in the lawn were *Poa annua* and *Lolium sp.*

15 days after application there was no new growth of the grasses on the treated areas, which however were green and healthy. By contrast on untreated areas the grasses had grown 5–7 cm and were in need of recutting to remain attractive.

EXAMPLE 13

This Example illustrates the herbicidal activity of 7-methylindole. A spray formulation was prepared containing 0.5 percent 7-methylindole; 4 percent of a surfactant mixture comprising 2.2 percent sorbitan monooleate, 7.8 percent of a condensate of 1 mole of serbitan monolaurate with 20 moles ethylene oxide and 90 percent methyl cyclohexane; and 95.5 percent water.

The composition so prepared was sprayed onto young pot plants (post emergence test) of the species named in Table 8 below, at a rate equivalent to 1000 litres per hectare (5 kilograms of indole per hectare). Damage to plants was assessed 14 days after spraying, on a scale of 0 to 5 where 0 is 0–20 percent damage and 5 represents complete kill. In a test for pre-emergence activity, fibre trays of soil previously sown with seeds of the plant species named in Table 8 below were sprayed with the composition at a rate equivalent to 1000 litres per hectare. Fourteen days after spraying, the seedlings in the sprayed fibre trays were compared with those in unsprayed control trays, the damage being assessed on the same scale of 0 to 5. The results are given in Table 8 below.

It should be noted that kill of plants in these tests is not necessarily complete after fourteen days; plants appearing healthy when assessed at this time may die subsequently, particularly in the pre-emergence test.

TABLE 8

| Compound No | Pre or Post Emergence | Sb | Rp | Ct | P | Sn | Ip | Am | Pa | Ca | Po | Mz | Br | Rc | Ot | Dg | El | Pn |
|---|---|---|---|---|---|---|---|---|---|---|---|---|---|---|---|---|---|---|
|  | Pre | 0 | 0 | 0 | 0 | 0 | 0 | 0 | 0 | 0 | 0 | — | — | 0 | 5 | 0 | 0 | 4 |
|  | Post | 0 | 0 | 1 | 0 | 3 | 1 | 0 | 0 | 1 | 0 | 1 | 3 | 1 | 3 | 4 | 4 | — |

Key to test species
Sb Sugar Beet
Rp Rape
Ct Cotton
P Pea
Sn Senecio vulgaris
Ip Ipomoea purpurea
Am Amaranthus retroflexus
Pa Polygonum aviculare
Ca Chenopodium album
Po Portulaca oleracea
Mz Maize
Br Barley
Rd Rice
Ot Oat
Dg Digitaria sanguinalis
El Eleusine indica
Pn Poa annua "Cirrasol" ALNWF is a condensate of ethylene oxide with oleyl and stearyl alcohols.

We claim:

1. The method of regulating the growth of plants which comprises applying to the plants 7-methylindole in an amount sufficient to at least stunt the growth thereof.

2. The method of claim 1 wherein the indole is applied to the plants in amount sufficient to cause substantial phytotoxic damage thereto.

3. The method of claim 1 wherein the amount of the indole applied to the plants is insufficient to cause substantial phytotoxic damage thereto.

4. The method of claim 3 wherein the plants are monocotyledons.

5. The method of claim 4 wherein the plants are sugar-cane, and the application is effective to increase the sugar content thereof.

* * * * *